United States Patent [19]

Williams

[11] 4,100,914
[45] Jul. 18, 1978

[54] SOLAR ENERGY COLLECTOR

[76] Inventor: Salvion Ed Williams, 6531 S. Atchinson Wy., Englewood, Colo. 80110

[21] Appl. No.: 798,637

[22] Filed: Jun. 13, 1977

[51] Int. Cl.² .............................................. F24J 3/02
[52] U.S. Cl. .................................. 126/270; 237/1 A
[58] Field of Search ................ 126/270, 271; 237/1 A

[56] References Cited

U.S. PATENT DOCUMENTS

| | | | |
|---|---|---|---|
| 3,960,135 | 6/1976 | Angilletta | 126/270 |
| 3,964,678 | 6/1976 | O'Hanlon | 126/270 |
| 3,994,276 | 11/1976 | Pulver | 126/270 |
| 4,046,133 | 9/1977 | Cook | 126/270 |
| 4,068,652 | 1/1978 | Worthington | 126/270 |

Primary Examiner—Kenneth W. Sprague
Attorney, Agent, or Firm—Jack C. Sloan

[57] ABSTRACT

A solar energy collector having a horizontal housing section adapted for insertion into an opening in the wall of a building, and housing having an upper warm air duct and a lower cool air duct, a lower manifold, an air pumping means, a plurality of opague, corrugated metal tubes wherein air is heated by the action of the sun, an upper manifold for collecting and dispensing the heated air, a reflecting surface for heating the rear portions of the tubes, and a transparent enclosure surrounding the tubes. The solar energy collector is particularly characterized by its adaptation for insertion into a window frame, its light weight, ease of installation, mechanical simplicity and low power requirements.

8 Claims, 4 Drawing Figures

SOLAR ENERGY COLLECTOR

BACKGROUND OF THE INVENTION

This invention generally relates to solar energy collectors having a plurality of tubular collector elements. Specifically, this invention relates to such a solar energy collector which has opague coated corrugated mental tubes spaced in a specific relationship to each other and spaced in a specific relationship to a reflecting surface. The collector is specifically adapted for insertion into an opening in a wall such as a window frame.

The use of tubular collector arrays and reflectors for the collection of solar energy is well known in the art, as taught by U.S. Pat. Nos. 4,002,160 and 2,213,894. However, in comparison with applicants invention, the prior art solar energy collectors are characterized by their more complicated mechanics, maintenance, their heavy weight, expense and difficulty of installation. In comparison, applicant's invention is light weight, mechanically simple, and easily installed by unskilled mechanics in a window frame in the same manner as a portable air conditioner. Hence, this system can be bought and installed for less than one-tenth of the cost of many of the prior art solar energy collections.

I have found that these advantages can be achieved when the tubes are made from opague coated, light weight, corrugated metal tubes, and positioned in a specific relationship to each other and as well as in a specific relationship to a reflecting surface and connected to a cool air intake duct and a warm air dispensing duct which are enclosed in a horizontal housing adapted for insertion into a wall opening.

DESCRIPTION OF THE PREFERRED EMBODIMENT

Figure 1:
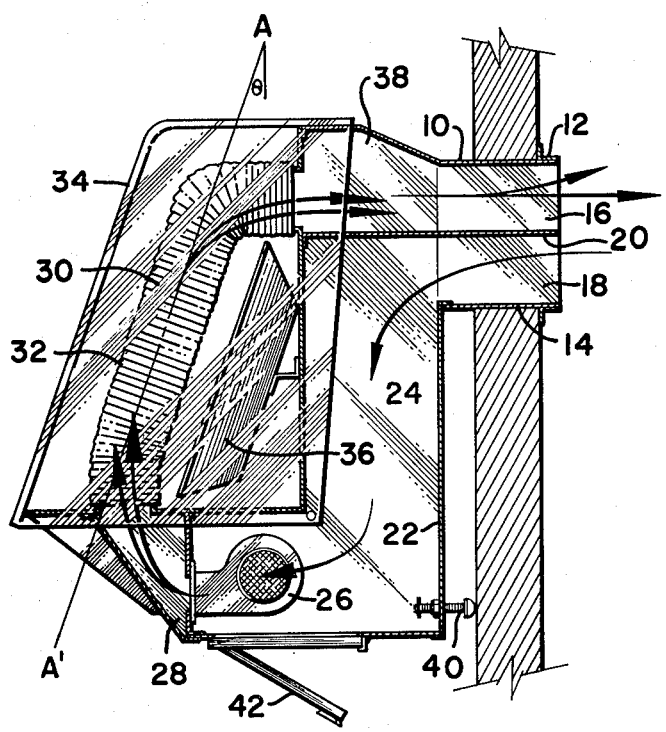
FIG. 1, is a side view, partially cut away, illustrating the flow of air through the system and showing one embodiment of this invention wherein the tubular members are in the same plane A—A' which is at an angle $\theta$ from the substantially perpendicular plane of the wall.
Figure 2:
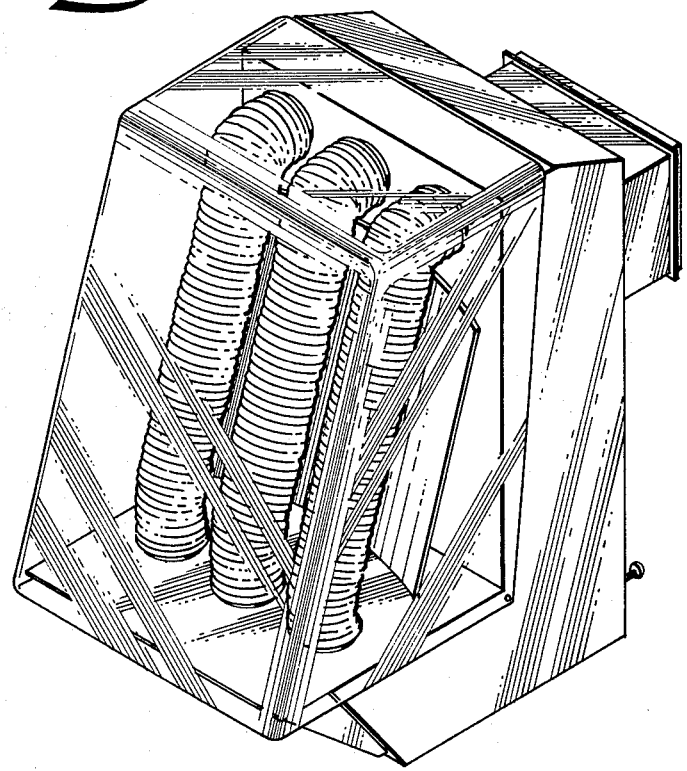
FIG. 2, is a isometric view of the solar energy collector.

Referring to FIG. 1, the solar energy collector includes in combination, a substantially horizontal housing section 10 adapted for inserting into and affixing by holding means 12, the horizontal housing section 10 to an opening in the wall 14 of a building such as an existing window frame. The horizontal housing section 10 contains an upper duct 16 for dispensing warm air into the building and a separate lower duct 18 for collecting relatively cooler air from within the building. The upper duct 16 and the lower duct 18 are separated by a partition 20 which preferrably has insulating capabilities. A substantially vertical housing section 22 is attached to the horizontal housing section 10 and contains an air intake duct 24 in air carrying connection with the lower duct 18 of the horizontal housing section 10. The vertical housing section 22 also contains an air pumping means 26 such as a fan or blower and a lower manifold 28 for directing the incoming cool air dispensed by the pumping means 26 into a plurality of opaque coated, corrugated metal tubes 30 wherein the air from the lower manifold 28 is heated by the action of the sun on the corrugated surfaces 32 of the tubes 30. The heated air in the tubes 30 rises by the natural tendency of warm air to rise and by the action of the pumping means 26. The warm air is collected in an upper manifold 38 and directed into the upper duct 16 of the horizontal housing section 10 and then into the building.

A reflecting surface 36 is positioned on the side of the tubular members 30 away from the sun. The reflecting surface 36 is substantially coextensive with the tubular members and is positioned a distance of not more than four times the diameter of the tubular members from the center line A—A' of the tubular members 30. A transparent enclosure 34 such as glass or plastic engages between the lower manifold 28 and the upper manifold 38 and the two vertical sides of the vertical housing section 22 to enclose the tubular members 30. Optionally, the vertical housing section can be provided with a contacting means such as an adjusting screw 40 to hold the vertical housing section 22 parallel to the wall of the building and a door 42 to service the air pumping means 26.

The applicant has discovered that corrugated metal tubes rather than tubes with smooth surfaces is an important aspect of this invention. Applicant's tests indicate that there is about a 5 percent increase in the heating efficiency of the system when the corrugated metal tubes are used. The effect is probably due to the increased surface area provided by the corrugated surface. The tubes can be made from any metal but are preferrably made from mild steel, tin plated, or zinc plated mild steels.

Figure 3:
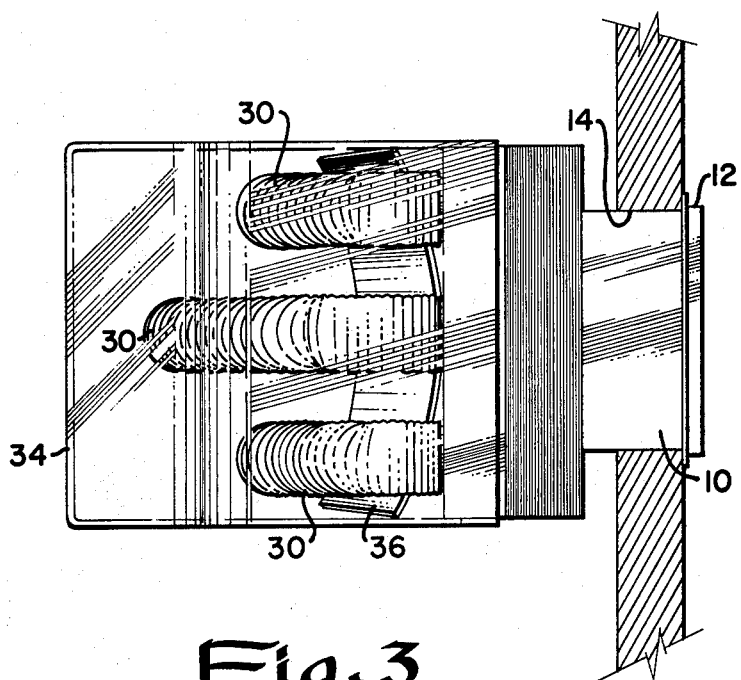
FIG. 3, is a top view of another embodiment of this invention showing the center tube set in a plane different from the plane of the two adjacent tubes.
Figure 4:
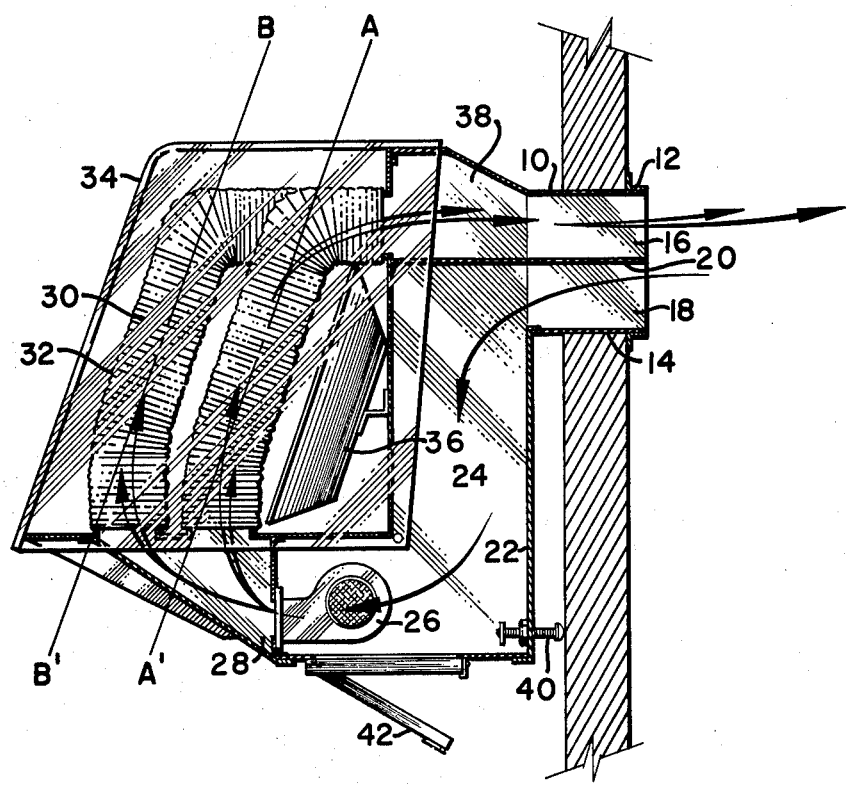
FIG. 4, is a side view, partially cut away, illustrating the flow of air through the system wherein the center tube is in a plane B—B' which is different from the plane A—A' of the two adjacent tubes.

This invention utilizes a plurality of corrugated metal tubes which are positioned at an angle $\theta$ from the perpendicular so that the lower portions of the tubes 30 are not shadowed by the upper portions of the tubes. Preferrably the angle $\theta$ should be between 5° and 45° and most preferrably between 20° and 30°. Shadowing effects can also be lowered by another embodiment of this invention depicted in FIGS. 3 and 4 wherein every second tube 30 is positioned in a plane B—B' which is different from the adjacent tubes in the plane A—A'. Applicant has found that about a 3% improvement in the overall heating capability of the solar energy collector can be achieved when the adjacent tubes are offset in such a manner that plane A—A' is from 1 to 2 diameters from plane B—B'.

In either embodiment, however, the reflecting surface 36 should be positioned substantially parallel to the tubes 30. Furthermore, the applicants have found that the tubes 30 should be positioned not more than 4 and more preferrably not more than 3 tube diameters away from the reflector surface 36 as measured from the center line A—A' or B—B', whichever is farther, to the reflector surface. The reflector surface can be either flat or parabolic with any suitable reflecting surface such as white paint, a mirror or a polished metal surface.

It will also be understood that this solar energy collector can be made to cooperate with conventional heating systems through known electrical thermostat systems.

Having thus described the preferred embodiments in some detail it will be clear to those having ordinary skill in the art that obvious modifications could be made to the system without departing from the spirit of the invention. Such obvious modifications are within the inventive concept. It is not intended that the words used to describe the invention nor the drawings be limiting on the invention, rather the only limitations placed are those in the appended claims.

I claim:

1. In a solar energy collector having a reflector and a plurality of tubular members in sealing engagement between an upper warm air dispensing manifold and a lower cool air collecting manifold wherein the improvement comprises, in combination:

(1) A substantially horizontal housing section adapted for insertion into an opening in the wall of a building, such as an existing window frame, said horizontal section containing an upper duct for dispensing warm air into the building and a separate lower duct for collecting relatively cool air from within the building;

(2) a substantially vertical housing section which is attached to the horizontal housing section, said vertical housing section containing, (a) an air intake duct in air carrying connection with the lower duct of the horizontal housing section, (b) an air pumping means, (c) a lower manifold for directing the cooler air dispensed by the pumping means into a plurality of tubular members, (d) a plurality of opague coated corrugated metal tubular members in air carrying connection between the lower manifold and an upper manifold, wherein air is heated by the action of the sun's rays on the outer walls of said tubular members and rises in the tubular members to the upper manifold through both the natural tendency of warm air to rise, and the action of the air pumping means, (e) an upper manifold for collecting the rising warm air and directing said air into the upper duct of the horizontal housing section, (3) a reflecting surface on the side of the tubular members away from the sun and being substantially coextensive with said tubular members, said reflecting surface being positioned a distance not more than four times the diameter of the tubular members which are farthest away from the reflecting surface;

(4) a transparent enclosure which engages between the lower manifold, the upper manifold, and the two vertical sides of the vertical housing section to enclose the tubular members.

2. The solar energy collector of claim 1 wherein the distance between the tubular members and the reflecting surface is not more than four tube diameters.

3. The solar energy collector of claim 2 wherein the lower parts of the tubular members attached to the lower manifold are farther away from the plane of the wall of the building than the upper parts of the tubular members connected to the upper manifold so that the tubular members are at an angle of 5° to 45° from the plane of the wall of the building.

4. The solar energy collector of claim 2 wherein every second tubular member is set in a plane different from the plane of the adjacent tubular member.

5. The solar energy collector of claim 1 wherein the tubular members have a corrugated metal surface substantially about their entire circumferences.

6. The solar energy collector of claim 5 wherein the tubular members have an energy-absorbing, opaque coating, covering substantially their entire outer surface.

7. The apparatus of claim 1 wherein the reflecting surface is concave with respect to the rays of the sun.

8. The solar energy collector of claim 1 wherein the horizontal housing section is adapted for insertion into an existing window frame.

* * * * *